United States Patent Office 2,975,205
Patented Mar. 14, 1961

2,975,205

PROCESS FOR PREPARING COMPLEX METAL SALTS OF OXIDIZED PETROLEUM OILS

Stanley J. Lucki, Camden, N.J., assignor to Socony Mobil Oil Company Inc., a corporation of New York No Drawing. Filed May 28, 1958, Ser. No. 738,288

11 Claims. (Cl. 260—452)

This invention is concerned with the production of complex metal salts of oxidized petroleum oils and to a method for preparing these salts. It also contemplates the use of these salts as detergents in mineral lubricating oils.

In copending application Serial No. 441,626, filed July 6, 1954, there is disclosed and claimed a method for the preparation of certain complex metal salts of oxidized oils. That method involved the oxidation of the oil in the presence of a defined excess of metal hydroxide reagent. Thus, the metal hydroxide reagent, in amounts ranging from about 2% to about 25%, by weight, was charged to the oil prior to the oxidation. The oxidation was then conducted to an extent sufficient to cause from about 5% to about 85% of the charged metal hydroxide to react with the oil. Thus, an excess of about 15% and up to about 95% of the metal hydroxide was present in the oil throughout the course of the oxidation. The products thus provided contained about 2 equivalents of metal per equivalent of acid-hydrogen formed in the oxidation, i.e., their metal contents were approximately twice that of so-called normal salts or soaps of oxidized oils. Thus, when a product, produced by the process of that application and having a content of 1.50% calcium, was de-metallized by means of hydrochloric acid, the resulting acidic product had a neutralization number (N.N.) of 21 and a saponification number (after the N.N. had been subtracted from the saponification number) of 18. This neutralization number would account for only 50% of the calcium, assuming the formation of neutral calcium salts. This indicates that the remaining 50% of the calcium was present in the product as some type of complex or coordination compound. These products were described to be detergents for mineral lubricating oils.

It has now been found that the oxidized oil products produced by the oxidation of an oil in the presence of an excess of metal hydroxide, such as those disclosed in the said copending application, can be reacted further with metal hydroxides to incorporate additional amounts of metal therein. Thus, it has now be found that such a reaction will take place in the presence of water under certain conditions. Specifically, it has been found that this reaction, which for convenience may be termed the "water-complexing reaction" is made to occur by adding water to a mixture comprising the metal-containing oxidized oil product and the metal hydroxide reagent and then causing the reaction mixture to be substantially completely dehydrated as described more fully hereinafter. The dehydrated reaction mixture is then filtered to provided the final product.

The products thus provided contain substantially higher amounts of metal than the straight oxidized oil products. Thus, for example, where calcium hydroxide is used as the metal hydroxide reagent, the metal content of the oxidized oil product is increased up to 54%. In the case of barium hydroxide, increases in the metal content of the oxidized oil product up to 82% have been accomplished. It will be appreciated that since the water-complexing reaction is conducted in the absence of further oxidation of the oil, i.e., after the oxidation process has been completed, the products thus produced contain a greater number of equivalents of metal than the straight oxidized oil products of the copending application, based on the amount of acid-hydrogen formed in the course of the oxidation. On the basis of the aforesaid increases in metal content, therefore, the products provided herein contain up to about 3 equivalents of metal in the case of calcium and up to about 3.75 equivalents in the case of barium. As far as is known, high metal content oxidized oil products of the character thus produced by this invention have not been known heretofore and these products, therefore, are believed to be new compositions of matter. However, since the exact chemical formula for these new products has not been presently determined, they are defined herein by means of their method of preparation. It has been found that these high metal content products are consistently better oil detergents, on a weight for weight basis, than the straight oxidized oil products.

It is, therefore, the primary object of this invention to provide a new class of complex metal salts of oxidized oils. A further object is to provide a process for the preparation of these new products. A still further object is to provide high detergency lubricating oil compositions containing small amounts of these new high metal content oxidized oil products. Other and further objects of the invention will be apparent from the following description thereof.

It will be seen that, broadly, the present invention provides a process for the preparation of a novel class of high metal content complex salts of oxidized petroleum oils which comprises oxidizing the oil in the presence of from about 2% to about 25%, by weight, of a metal hydroxide reagent to an extent sufficient to incorporate from about 5% to about 85% of the metal hydroxide into the oil and then reacting the product thus obtained with more metal hydroxide, in the presence of water, to incorporate an additional amount of metal hydroxide into said product.

In practicing the invention, the metal hydroxide reagent in an amount ranging from about 2% to about 25%, by weight, is mixed with the oil prior to the start of the oxidation. Although higher amounts of the metal hydroxide may be used, they are generally undesirable from the standpoint of the fluidity of the reaction mass and filtration thereof to obtain the finished product. Filtration, however, may be facilitated, in instances where it is difficult, by use of a diluent solvent, such as benzene, toluene, or the like, which may be added to the reaction mixture prior to filtration and then subsequently removed.

The oxidation step of the process is carried out by heating the reaction mixture to a temperature of from about 250° F. to about 600° F. and preferably from about 350° F. to about 450° F. while passing an oxidizing gas, such as air or oxygen, therethrough. The oxidation is continued for a time sufficient to effect the reaction of at least about 5%, but not more than about 85%, of the charged metal hydroxide. The oxidation is then stopped, the reaction mixture is cooled to a temperature below the boiling point of water and water is added. The amount of water required is generally small, being from about 2% to about 10%, by weight, of the reaction mixture, although larger amounts, up to as high as 50%, may be used without harmful effect. However, the use of large amounts of water will unnecessarily prolong the dehydration time. The reaction mixture is then dehydrated and filtered to provide the final product. Dehydration is ordinarily accomplished by heating the reaction mixture while passing a stream of nitrogen therethrough, the mixture being heated initially to 200–210° F. and the temperature being gradually increased up to about 325–400° F. as the rate of the water removal decreases. The product is generally filtered at or near this latter temperature level in order to provide relatively rapid filtration. The dehydration may, however, be accomplished in other ways. Thus, a solvent, such as benzene, may be added and the water driven off as an azeotropic mixture.

It will be understood that the water-complexing reaction may also be applied to a finished oxidized oil product, i.e., one which has been filtered to remove the excess metal hydroxide, but in such case it will be necessary to add an additional amount of metal hydroxide to the reaction along with the water. The amount of metal hydroxide present in the reaction mixture for the purpose of the water-complexing step should in any case be at least about 2% and may suitably be as high as about 25%, based on the weight of the oil originally charged to the oxidation.

The time required for the oxidation step will, of course, depend upon several factors. Thus, the temperature of the reaction, the type of oil stock employed, the rate of introduction of the oxidizing gas and the efficiency of the contacting of the oxidizing gas with the oil all affect the oxidation time. It will be appreciated, however, that the proper oxidation time in any case will be that which provides for the utilization of the required amount of the metal hydroxide as above defined. Thus, the proper time can be determined by conducting several oxidations for different periods of time, while maintaining the other reaction variables constant and noting the amount of metal hydroxide utilized in each instance. As will be seen from the examples presented hereinafter, the oxidation time may vary over a relatively wide range, oxidation times of from several hours up to 100 hours, or more, having been used, depending upon the reaction conditions employed. From a practical standpoint, it is, of course, ordinarily desirable to utilize reaction conditions which are conducive to effecting the oxidation to the required extent in the shortest possible period of time. Accordingly, it is considered that modifications designed to increase the efficiency of the oxidation, such as the use of known oxidation catalysts, special reactors, etc., are clearly within the spirit and scope of this invention.

The metal hydroxide reagents utilizable for the preparation of the metal-containing oxidized oil products of the invention are those of the metals of Group II of Mendeleeff's Periodic Table of the Elements. Specifically, the hydroxides of calcium, barium, strontium, zinc and magnesium are suitable with calcium hydroxide being particularly preferred. Various commercial grades of calcium oxide, calcium hydroxide, and barium hydroxide are suitable for use in the invention. However, Grease Makers Lime (96% calcium hydroxide) is preferred because of its high purity, small particle size and its property of being wetted by the oil.

The oil to be oxidized may be any petroleum oil of light, medium or heavy grade, the chief limiting factor with respect thereto being the solubility in oil of the resulting product, as these products are contemplated particularly for use as detergents for lubricating oils. Generally, suitability from this standpoint requires that the oil have an average molecular weight of at least about 300. However, heavier oils having molecular weights of from about 600 up to about 1000 are particularly suitable. The use of conventionally refined oils having molecular weights in the latter range are especially preferred from the standpoint of solubility in oil of the resulting products. In terms of viscosity, oils having viscosities ranging from about 20 to 300 S.U.V. at 210° F. may be used, with those of from about 100 to 200 S.U.V. at 210° F. being preferred. The characteristics of several highly suitable oil stocks are shown in Table I.

TABLE I

*Properties of oil stocks*

| Oil Type | Specific Grav. 60/60 | API Grav. | Aniline Pt., °C. | Avg. Mol. Wt. | Percent S | SUV (Sec.) 100° F. | SUV (Sec.) 210° F. | V.I. | Flash, °F. |
|---|---|---|---|---|---|---|---|---|---|
| Percolated Mid-Continent Bright Stock | 0.8996 | 25.8 | 119.2 | 720 | 0.7 | 1,848 | 123.8 | 94 | 525 |
| Unpercolated Mid-Continent Bright Stock | 0.8950 | 26.6 | 121.2 | 880 | | 1,903 | 125.5 | 93.5 | |
| East Texas Hvy. Waxy Dist. Stock | | 26.9 | | 470 | 0.24 | 619 | 66.8 | 85 | 495 |

To further illustrate the process of the invention and to show the outstanding ability of the products provided by the invention as detergents for mineral lubricating oils, the following examples and test results are presented.

EXAMPLE 1

Twelve hundred grams of a percolated solvent-refined Mid-Continent type bright stock and 87 g. (7.2 weight percent) of calcium hydroxide were charged to a 3-liter, round-bottomed, four-necked flask equipped with a stirrer, thermometer and two filter sticks (medium grain) for introduction and dispersion of air. Ten liters of air per filter stick per hour were bubbled through the oil, maintained at 375° F., over a period of 101½ hours. The oxidation was then stopped and the reaction mixture was stirred with 4 weight percent of "Hyflo" (a diatomaceous earth filter aid), filtered and cooled. The product thus obtained analyzed 1.98% calcium. The calcium hydroxide utilized in the reaction was 51% of the charged amount.

Four hundred grams of the above product were charged to a 2-liter, round-bottomed flask equipped with a stirrer, thermometer and inlet tube for stripping gas (nitrogen) and a water take-off. One hundred thrity-five milliliters of a 10% calcium hydroxide aqueous slurry were then added. The water was then removed by raising the temperature of the mixture gradually to about 420° F. using a nitrogen stream. The product was then contacted with 6 weight percent of "Hyflo" and filtered. Analysis of this product showed it to contain 2.24% calcium. This represents an increase of 13% over that of the straight oxidized oil product.

EXAMPLE 2

In a flask reactor of the type used in Example 1, 5000 grams of a solvent-refined Mid-Continent bright stock were oxidized for 78 hours at 375° F. in the presence of 1000 grams (20 weight percent) of calcium hydroxide using 6 bubblers (filter sticks) and an air rate of 40 liters per hour per bubbler. The oxidized product was contacted with 4 weight percent of "Hyflo," filtered and cooled. The product contained 1.57% calcium, which represented a utilization of 15% of the calcium hydroxide charge.

Five hundred grams of the above product, diluted with 100 milliliters of toluene, were charged to a flask reactor of the type utilized for the water-complexing reaction in Example 1. With the temperature at 175° F., 100 grams of calcium hydroxide and 150 milliliters of water were added. The mixture was stirred while the temperature was raised to 320° F. over a period of 3 hours, which effected removal of the water. The product was contacted with 4 weight percent of "Hyflo," filtered and cooled. This product analyzed 1.95% calcium, which represents an increase of 24% in metal content over the oxidized oil product.

EXAMPLE 3

Two thousand grams of an unpercolated solvent-refined Mid-Continent bright stock and 218 grams (11 weight percent) of calcium hydroxide were charged to an electrically heated column reactor, 60 in. long by 3 in. in diameter, equipped with a fritted glass plate sealed in the bottom. Sixty liters of air per hour were passed up through the oil at 400° F. for 24 hours. A portion of the reaction mixture was contacted with 4 weight percent of "Hyflo" and filtered. Analysis showed the filtrate to contain 1.67% calcium, which represents a 29% utilization of the calcium hydroxide charge.

The column reactor used in this example provides a much more efficient use of the oxidizing gas than the flask reactor utilized in the previous examples, so that the time of oxidation is made much shorter.

The remainder of the reaction mixture in the column reactor was cooled to 205° F. and 500 milliliters of water were added. The water was then stripped off by raising the temperature to 400° F. over a period of about 16 hours while passing a stream of nitrogen through the reaction mixture, which was then contacted with 4 weight percent of "Hyflo" and filtered. Analysis showed the filtered product to contain 2.43% calcium which represents an increase of 46% over that of the straight oxidized oil product.

EXAMPLE 4

The oxidation step in this example was similar to that of Example 3, except that 435 grams (21.7 weight percent) of calcium hydroxide was used and the oxidation time was 30 hours. A portion of the reaction mixture was contacted with "Hyflo" and filtered. The product contained 1.44% calcium, which represented a utilization of 12% of the calcium hydroxide charge.

Three hundred sixty-five grams of the above unfiltered reaction mixture and 15 milliliters of water (equivalent to 5 weight percent based on the oil content in the oxidized oil-lime mixture) were charged to a flask reactor suitable for stripping off the water and the water was rapidly removed in a nitrogen stream as the temperature was increased to about 400° F. The product was then filtered in contact with 5 weight percent of "Hyflo." Analysis showed a calcium content of 1.84%, which represents an increase of 28% over the oxidized oil product.

EXAMPLE 5

The oxidation step of this example was the same as that of Example 2, except that 10 weight percent more calcium hydroxide was used and the oxidation time was 72 hours. A portion of the filtered product contained 1.44% calcium, which represents a 12% utilization of the calcium hydroxide charge.

Two hundred and fifty grams of the filtered product, 100 milliliters of toluene, 100 grams of dry barium hydroxide and 75 milliliters of water were charged into a flask reactor, having an inlet tube for stripping gas and a water take-off. The temperature was gradually raised to 390° F., with stirring, to remove the water. The mixture was then contacted with 6 weight percent of "Hyflo," filtered and cooled. The product had a calcium content of 0.73% and a barium content of 6.5%. This represents an 82% increase in metal content, based on conversion of barium equivalents to calcium equivalents, over the straight oxidized oil product.

EXAMPLE 6

Two thousand grams of a solvent-refined Mid-Continent type bright stock were air-oxidized utilizing the column reactor as in Example 3. The conditions were similar to those of Example 3, except that the temperature and reaction time were 425° F. and 17 hours, respectively. A portion of the filtered reaction mixture had a calcium content of 1.62%, which indicates that 27% of the calcium hydroxide was reacted with the oil.

The remainder of the reaction mixture was contacted with 500 milliliters of water at about 200° F. in the column reactor immediately after oxidation. The temperature was raised to 400° F. over a period of about 16 hours to strip off the water using a stream of nitrogen. The product was then contacted with 4 weight percent of "Hyflo," filtered and cooled. Analysis showed the product to contain 2.09% calcium, an increase of 29% over the straight oxidized oil.

EXAMPLE 7

The oxidation step of this example was the same as in Example 3, except that 435 grams (21.7 weight percent) of calcium hydroxide were used. The preparation was repeated five times and the products blended together. A portion of the resulting composite product was filtered and found to contain 1.65% calcium.

Six portions of an oxidized oil reaction mixture prepared as above were subjected to water-complexing after the fashion of Example 3. The resulting products were then blended together to give a composite product containing 1.89% calcium.

As pointed out previously, the oxidation of the oil in the presence of the excess metal hydroxide produces a metal-containing oxidized oil product having about 2 equivalents of metal per equivalent of acid-hydrogen formed in the oxidation. This is true whether the oxidation is carried out to a greater or lesser extent. The water-complexing step, however, introduces additional equivalents of metal into the oxidized oil product in all cases. Thus, it will be understood that the highest amount of metal, on a weight percent basis, which is incorporated into the oil by the oxidation step in all cases, is still further increased by the metal hydroxide-water complexing reaction. This is illustrated by the following examples.

EXAMPLE 8

Two thousand grams of East Texas heavy, waxy distillate stock was oxidized utilizing the column reactor as in Example 3. The conditions were similar to those of Example 3, except that the oxidation time was 14 hours. Also, a sufficient sample was removed after 7 hours for further complexing. The 7-hour sample had a calcium content of 0.45%, while the 14-hour product had a calcium content of 0.94%.

(a) Three hundred grams of the 7-hour sample and 70 milliliters of water were charged to a reactor of the type used in the previous examples for the complexing reaction, i.e., having a suitable inlet tube for stripping gas and a water take-off. The water was removed in about 2 hours in the manner of Example 3 and the product contacted with 4% "Hyflo" and filtered. This product had a calcium content of 0.58%.

(b) Three hundred grams of the 14-hour product was complexed under the same conditions as in (a). The finished product had a calcium content of 1.45%.

It is seen that the calcium content of the oxidized product of Example 3, which used a 24-hour oxidation period, was 1.67%, whereas the calcium contents of Examples 8(a) and 8(b) were proportionately smaller. However, the calcium contents of all three products were substantially increased by the water-complexing reaction.

Products of the character provided by this invention cannot be obtained by first oxidizing the oil, i.e., in the absence of the metal hydroxide, and then reacting the oxidized oil with the metal hydroxide reactant in the presence of water. This is shown by the following example.

EXAMPLE 9

One thousand grams of unpercolated, solvent-treated bright stock were charged to a flask reactor of the type used in the previous examples and having two filter sticks for admission of air. Ten liters of air per hour per filter stick were bubbled through the oil at 425° F. for 24 hours. The oxidized oil was then contacted with 4%, by weight, of "Hyflo" and filtered. The product had an Acid Number of 7.7 and a Saponification Number of 67.

Five hundred grams of the oxidized oil, diluted with 200 milliliters of toluene, together with 100 grams of calcium hydroxide and 75 milliliters of water, were charged to a reactor suitable for stripping off the water. The mixture was heated to reflux temperature to remove the water and most of the solvent. The product then became extremely viscous and stirring had to be discontinued. A sample of the product was diluted with benzene and filtered. Upon complete removal of the solvent, a rubber-like product was obtained which had a calcium content of only 0.67%.

However, when the same bright stock used in the foregoing example was air-oxidized in the presence of calcium hydroxide for 17 hours at 425° F. and further complexed with lime and water, the product was a viscous oil having a calcium content of 2.09%.

Detergent ability

As is well known, internal combustion engine lubricating oils, under the severe oxidizing conditions encountered in use, gradually deteriorate with attendant formation of sludge, lacquer and resinous materials which adhere to the engine parts, particularly the piston ring grooves and skirts, thereby lowering the efficiency of the engine and frequently causing the rings to stick. To counteract this condition, it has become the practice in the lubricating art to fortify such oils by the addition thereto of minor amounts of chemical agents which have the ability to keep the deposit-forming materials suspended in the oil. Such chemical agents are known as detergents. As stated previously, the metal-containing oxidized oil products produced by the process of the present invention are excellent motor oil detergents and they are more effective detergents, on a weight for weight basis, than the straight oxidized oil products. This is illustrated by the test data presented in Table II. In this table are shown the results of engine tests conducted on a series of oil blends prepared from both types of products. The oxidized oil products used in the tests were the following.

EXAMPLE 2-A

The product of this example was a portion of the product prepared in the oxidation step of Example 2 above.

EXAMPLE 3-A

The product of this example was prepared in a manner similar to the oxidized oil product of Example 3, except for slight variations in the temperature and oxidation time. The product had a calcium content of 2.08%.

EXAMPLE 5-A

This product was prepared in the same manner as the oxidation of Example 5 above, except that the oxidation time was 90 hours as compared to 72 hours for Example 5. The product had a calcium content of 1.70%.

EXAMPLE 7-A

The product of this example was a portion of the finished product prepared by the oxidation step of Example 7.

Engine evaluation

The tests used were the Lauson D4-A detergency test and the CFR diesel D-21 detergency test which are described herein below. The base oils and the oil blends used, in all cases, contained 1% of an anti-oxidant additive (a pinene-$P_2S_5$ reaction product). This is standard practice in evaluating oil detergents. Also, the additives were compared on an equivalent metal basis, viz., 0.058% for the calcium products and 0.2% for the barium products in the D4-A test and 0.088% for the calcium products and 0.30% for the barium products in the CFR D-21 test.

Lauson engine test

This test determines the effectiveness of the lubricating oil in preventing fouling as measured by the cleanliness of rings, lands, ring grooves and piston skirts. Cleanliness ratings are based on a scale of from 100 to 0, a 100 rating signifying a perfectly clean condition and a 0 rating representing the worst possible deposit condition.

A single cylinder, 4-cycle, liquid cooled Lauson engine with splash lubrication and having copper-lead bearings is used. The operating conditions are as follows:

Oil temperature_____°F____ 225
Jacket temperature_____°F____ 275
Speed _____r.p.m____ 1825
Brake load_____H.P____ 1.6
One-half throttle.
13–1 air-fuel ratio.
Oil added every 20 hours (one-gallon sample used).

The duration of the test is 100 hours.

Diesel engine test

This test determines the effectiveness of the lubricating oil in preventing piston deposits and top ring wear.

A single cylinder, DFR, 4-cycle, super-charged, diesel engine is used. The operating conditions are as follows:

Oil temperature_____°F____ 175
Jacket temperature_____°F____ 212
Speed _____r.p.m____ 1800
Brake load_____H.P____ 7.5
Oil addition every 8 hours starting at 4 hours (1½ gal. sample used).
Heat input_____B.t.u./min____ 1260

The duration of the test is 60 hours. The results are reported in terms of piston cleanliness ratings as in the Lauson engine test.

It will be seen from the data in Table II that the detergency ratings obtained with the oil blends of the water-complexed oxidized oil products of Examples 2, 3, 5 and 7 are substantially equivalent to, or better than, those obtained with the oil blends of the straight oxidized oil products of Examples 2-A, 3-A, 5-A and 7-A, respectively, but that the amount of the former products added to the base oil was considerably less in each case. The water-complexed products of the present invention are, therefore, much more powerful as detergents than the straight oxidized oil products on a weight for weight basis.

It will be appreciated that the products of the invention are actually oil solutions of the complex oxidized oil salts and although the products shown in the examples presented therein vary with respect to their complex salt contents, it will be understood that these differences can be eliminated by standardization of process procedure and also, when required, by distillation of a portion of the oil therefrom. The amount of product required to be added to a lubricating oil to provide the desired increase in the detergent ability thereof, therefore, will vary depending upon the process conditions utilized in preparing the particular products. In general, however, the amount of the product to be utilized will range from about 1% to about 10%, by weight, the usual amount being from about 2% to about 5%.

The products of the invention may also be added to oils containing other additives designed to improve the various characteristics thereof, such as anti-oxidants, pour point depressants, viscosity index improvers, defoamants, rust preventives, etc.

Although the products of the invention are intended primarily for use as detergents for lubricating oils, they are also utilizable for many of the purposes for which metal salts of organic acids are used, e.g., as components in coating compositions, paint driers, detergent soaps, dispersants, rust-preventive compositions, etc.

Although the invention has been described herein by means of certain specific embodiments and illustrative examples, it is not intended that it be limited in any way thereby, but only as indicated in the accompanying claims.

This application is a continuation-in-part of copending application Serial No. 441,650, filed July 6, 1954, now abandoned.

TABLE II

*Engine evaluation*

| Product Added to Oil | Complexing Agent | Percent Metal in Product | Lauson Engine Test [1] | | Diesel Engine Test [2] | |
|---|---|---|---|---|---|---|
| | | | Percent Product In Oil [3] | 100 Hour Detergency Rating | Percent Product In Oil [4] | 60 Hour Detergency Rating |
| Base Oil | | | 0 | 59 | 0 | 62 |
| 2–A | None | 1.57 | 3.7 | 74 | | |
| 2 | Ca(OH)₂–H₂O | 1.95 | 3.0 | 73 | 4.5 | 90 |
| 3–A | None | 2.08 | 2.89 | 73 | 4.23 | 90 |
| 3 | Ca(OH)₂–H₂O | 2.43 | 2.40 | 71 | | |
| 5–A | None | 1.70 | 3.4 | 74 | | |
| 5 | Ba(OH)₂–H₂O | { .73 Ca, 6.50 Ba } | 2.22 | 77 | | |
| 7 | None | 1.65 | 3.5 | 72 | 5.33 | 88 |
| 7–A | Ca(OH)₂–H₂O | 1.89 | 3.07 | 77 | 4.66 | 87 |

[1] SAE 20 grade solvent-refined Penn. Oil, K.V. at 100° F.=63, K.V. at 210° F.=8.3.
[2] SAE 30 grade solvent-refined Mid-Continent oil, K.V. at 100° F.=121, K.V. at 210° F.=12.2.
[3] The percent metal in oil blend equivalent to 0.058% calcium or 0.2% barium.
[4] The percent metal in oil blend equivalent to 0.088% calcium or 0.3% barium.

What is claimed is:

1. The process for preparing a complex metal salt of an oxidized petroleum oil which comprises (1) forming a mixture comprising (a) a petroleum oil having an average molecular weight of from about 300 to about 1000 and (b) from about 2% to about 25%, based on the weight of said oil, of a hydroxide of a metal of group II of the periodic table of the elements, (2) contacting said mixture with an oxidizing gas at a temperature of from about 250° F. to about 600° F., and for a time sufficient to effect oxidation of said oil and reaction of from about 5% to about 85% of said metal hydroxide with the oxidized oil, (3) providing a mixture comprising the oxidized oil-metal hydroxide reaction product produced in step 2, a metal hydroxide of a metal of group II of the periodic table of the elements, in an amount ranging from about 2% to about 25%, based upon the weight of said oil used in step 1 to prepare the amount of reaction product from step 2 which is used in step 3, and from about 2% to about 50% of water, based upon the weight of the mixture of the oxidized oil-metal hydroxide reaction product and metal hydroxide so provided, at a temperature below the boiling point of water, (4) substantially completely dehydrating the mixture formed in step 3 and (5) subjecting the dehydrated mixture from step 3 to filtration to separate the complex metal salt product.

2. The process for preparing a complex metal salt of an oxidized petroleum oil which comprises (1) forming a mixture comprising (a) a petroleum oil having an average molecular weight of from about 300 to about 1000 and (b) from about 2% to about 25%, based on the weight of said oil, of a hydroxide of a metal of group II of the periodic table of the elements, (2) contacting said mixture with an oxidizing gas at a temperature of from about 250° F. to about 600° F. and for a time sufficient to effect oxidation of said oil and reaction of from about 5% to about 85%, of said metal hydroxide with the oxidized oil, (3) adding water to the resulting reaction mixture, in an amount of from about 2% to about 50% based on the weight of said reaction mixture, at a temperature below the boiling point of water, (4) substantially completely dehydrating said reaction mixture and (5) subjecting the dehydrated reaction mixture to filtration to separate the complex metal salt product.

3. The process for preparing a complex calcium salt of an oxidized petroleum oil which comprises (1) forming a mixture comprising (a) a petroleum oil having an average molecular weight of from about 300 to about 1000 and (b) from about 2% to about 25%, based on the weight of said oil, of calcium hydroxide, (2) contacting said mixture with an oxidizing gas at a temperature of from about 250° F. to about 600° F. and for a time sufficient to effect oxidation of said oil and reaction of at least about 5%, but not more than about 85%, of said calcium hydroxide with the oxidized oil, (3) adding water to the resulting reaction mixture, in an amount of from about 2% to about 50% based on the weight of said reaction mixture, at a temperature below the boiling point of water, (4) substantially completely dehydrating said reaction mixture and (5) subjecting the dehydrated reaction mixture to filtration to separate the complex calcium salt product.

4. The process for preparing a complex calcium salt of an oxidized petroleum oil which comprises (1) forming a mixture comprising (a) a conventionally refined petroleum oil having an average molecular weight of from about 600 to about 1000 and (b) from about 2% to about 25%, based on the weight of said oil, of calcium hydroxide, (2) contacting said mixture with an oxidizing gas at a temperature of from about 350° F. to about 450° F. and for a time sufficient to effect oxidation of said oil and reaction of at least about 5%, but not more than about 85%, of said calcium hydroxide with the oxidized oil, (3) adding from about 2% to about 10%, by weight, of water to the resulting reaction mixture at a temperature below the boiling point of water, (4) substantially completely dehydrating said reaction mixture and (5) subjecting the dehydrated reaction mixture to filtration to separate the complex calcium salt product.

5. The process for preparing a complex barium salt of an oxidized petroleum oil which comprises (1) forming a mixture comprising (a) a petroleum oil having an average molecular weight of from about 300 to about 1000 and (b) from about 2% to about 25%, based on the weight of said oil, of barium hydroxide, (2) contacting said mixture with an oxidizing gas at a temperature of from about 250° F. to about 600° F. and for a time sufficient to effect oxidation of said oil and reaction of at least about 5%, but not more than about 85%, of said barium hydroxide with the oxidized oil, (3) adding water to the resulting reaction mixture, in an amount of from about 2% to about 50% based on the weight of said reaction mixture, at a temperature below the boiling point of water, (4) substantially completely dehydrating said reaction mixture and (5) subjecting the dehydrated reaction mixture to filtration to separate the complex barium salt product.

6. The process for preparing a complex barium salt of an oxidized petroleum oil which comprises (1) forming a mixture comprising (a) a conventionally refined petroleum oil having an average molecular weight of from about 600 to about 1000 and (b) from about 2% to about 25%, based on the weight of said oil, of barium hydroxide, (2) contacting said mixture with an oxidizing gas at a temperature of from about 350° F. to about 450° F. and for a time sufficient to effect oxidation of said oil and reaction of at least about 5%, but not more than about 85%, of said barium hydroxide with the oxidized oil, (3) adding from about 2% to about 10%, by weight, of water to the resulting reaction mixture at a temperature below the boiling point of water, (4) substantially completely dehydrating said reaction mixture and (5) subjecting the dehydrated reaction mixture to filtration to separate the complex barium salt product.

7. The process for preparing a complex metal salt of an oxidized petroleum oil which comprises (1) forming a mixture comprising (a) a petroleum oil having an average molecular weight of from about 300 to about 1000 and (b) from about 2% to about 25%, based on the weight of said oil, of a hydroxide of a metal of group II of the periodic table of the elements, (2) contacting said mixture with an oxidizing gas at a temperature of from about 250° F. to about 600° F. and for a time sufficient to effect oxidation of said oil and reaction of from about 5% to about 85%, of said metal hydroxide with the oxidized oil, (3) subjecting the resulting reaction mixture to filtration to remove unreacted metal hydroxide therefrom, (4) mixing with the filtrate from step 3 from about 2% to about 50%, based on the weight of said filtrate, of water and from about 2% to about 25%, based on the weight of said oil used in step 1 to prepare the amount of filtrate from step 3 which is used in step 4, of a hydroxide of a metal of group II of the periodic table of the elements at a temperature below the boiling point of water, (5) substantially completely dehydrating the mixture from step 4 and (6) subjecting the dehydrated mixture to filtration to separate the complex metal salt product.

8. The process for preparing a complex calcium salt of an oxidized petroleum oil which comprises (1) forming a mixture comprising (a) a petroleum oil having an average molecular weight of from about 300 to about 1000 and (b) from about 2% to about 25%, based on the weight of said oil, of calcium hydroxide, (2) contacting said mixture with an oxidizing gas at a temperature of from about 250° F. to about 600° F. and for a time sufficient to effect oxidation of said oil and reaction of from about 5% to about 85%, of said calcium hydroxide with the oxidized oil, (3) subjecting the resulting reaction mixture to filtration to remove unreacted calcium hydroxide therefrom, (4) mixing with the filtrate from step 3 from about 2% to about 50%, based on the weight of said filtrate, of water and from about 2% to about 25%, based on the weight of said oil used in step 1 to prepare the amount of filtrate from step 3 which is used in step 4, of calcium hydroxide at a temperature below the boiling point of water, (5) substantially completely dehydrating the mixture from step 4 and (6) subjecting the dehydrated mixture to filtration to separate the complex calcium salt product.

9. The process for preparing a complex calcium salt of an oxidized petroleum oil which comprises (1) forming a mixture comprising (a) a conventionally refined petroleum oil having an average molecular weight of from about 600 to about 1000 and (b) from about 2% to about 25%, based on the weight of said oil, of calcium hydroxide, (2) contacting said mixture with an oxidizing gas at a temperature of from about 350° F. to about 450° F. and for a time sufficient to effect oxidation of said oil and reaction of from about 5% to about 85%, of said calcium hydroxide with the oxidized oil, (3) subjecting the resulting reaction mixture to filtration to remove unreacted calcium hydroxide therefrom, (4) mixing with the filtrate from step 3 from about 2% to about 10%, based on the weight of said filtrate, of water and from about 2% to about 25%, based on the weight of said oil used in step 1 to prepare the amount of filtrate from step 3 which is used in step 4, of calcium hydroxide at a temperature below the boiling point of water, (5) substantially completely dehydrating the reaction mixture from step 4 and (6) subjecting the dehydrated mixture to filtration to separate the complex calcium salt product.

10. The process for preparing a complex barium salt of an oxidized petroleum oil which comprises (1) forming a mixture comprising (a) a petroleum oil having an average molecular weight of from about 300 to about 1000 and (b) from about 2% to about 25%, based on the weight of said oil, of barium hydroxide, (2) contacting said mixture with an oxidizing gas at a temperature of from about 250° F. to about 600° F. and for a time sufficient to effect oxidation of said oil and reaction of from about 5% to about 85%, of said barium hydroxide with the oxidized oil, (3) subjecting the resulting reaction mixture to filtration to remove unreacted barium hydroxide therefrom, (4) mixing with the filtrate from step 3 water and from about 2% to about 25%, based on the weight of said oil used in step 1 to prepare the amount of filtrate from step 3 which is used in step 4, of barium hydroxide at a temperature below the boiling point of water, (5) substantially completely dehydrating the mixture from step 4 and (6) subjecting the dehydrated mixture to filtration to separate the complex barium salt product.

11. The process for preparing a complex barium salt of an oxidized petroleum oil which comprises (1) forming a mixture comprising (a) a conventionally refined petroleum oil having an average molecular weight of from about 600 to about 1000 and (b) from about 2% to about 25%, based on the weight of said oil, of barium hydroxide, (2) contacting said mixture with an oxidizing gas at a temperature of from about 350° F. to about 450° F. and for a time sufficient to effect oxidation of said oil and reaction of from about 5% to about 85%, of said barium hydroxide with the oxidized oil, (3) subjecting the resulting reaction mixture to filtration to remove unreacted barium hydroxide therefrom, (4) mixing with the filtrate from step 3 from about 2% to about 10%, based on the weight of said filtrate, of water and from about 2% to about 25%, based on the weight of said oil used in step 1 to prepare the amount of filtrate from step 3 which is used in step 4, of barium hydroxide at a temperature below the boiling point of water, (5) substantially completely dehydrating the reaction mixture from step 4 and (6) subjecting the dehydrated mixture to filtration to separate the complex barium salt product.

References Cited in the file of this patent

UNITED STATES PATENTS

| | | |
|---|---|---|
| 2,008,490 | Dietrich | July 16, 1935 |
| 2,533,620 | Polly | Dec. 12, 1950 |
| 2,682,553 | Kirk et al. | June 29, 1954 |
| 2,779,737 | Koft et al. | Jan. 29, 1957 |
| 2,895,978 | Brooks | July 21, 1959 |
| 2,915,467 | McCormick | Dec. 1, 1959 |